(12) United States Patent
Smith (10) Patent No.: US 11,126,425 B2
(45) Date of Patent: Sep. 21, 2021

(54) VERSION HISTORY MANAGEMENT USING A BLOCKCHAIN

(71) Applicant: Sarcos Corp., Salt Lake City, UT (US)

(72) Inventor: Fraser M. Smith, Salt Lake City, UT (US)

(73) Assignee: Sarcos Corp., Sait Lake City, UT (US)

( * ) Notice: Subject to any disclaimer, the term of this patent is extended or adjusted under 35 U.S.C. 154(b) by 0 days.

(21) Appl. No.: 16/389,840

(22) Filed: Apr. 19, 2019

(65) Prior Publication Data

US 2020/0334032 A1    Oct. 22, 2020

(51) Int. Cl.
| | |
|---|---|
| *G06F 8/658* | (2018.01) |
| *G06F 8/71* | (2018.01) |
| *H04L 9/06* | (2006.01) |

(52) U.S. Cl.
CPC .............. *G06F 8/658* (2018.02); *G06F 8/71* (2013.01); *H04L 9/0637* (2013.01); *H04L 2209/38* (2013.01)

(58) Field of Classification Search
None
See application file for complete search history.

(56) References Cited

U.S. PATENT DOCUMENTS

| 1,005,724 | A1 | 8/2018 | Kumar et al. | |
|---|---|---|---|---|
| 10,558,457 | B1 * | 2/2020 | Kolb | G06F 8/71 |
| 2018/0167198 | A1 * | 6/2018 | Muller | G06F 21/44 |
| 2018/0176229 | A1 * | 6/2018 | Bathen | H04W 12/106 |
| 2018/0232433 | A1 * | 8/2018 | Kanvinde | G06F 16/25 |
| 2018/0343175 | A1 * | 11/2018 | Bathen | G06F 16/134 |
| 2019/0012595 | A1 * | 1/2019 | Beser | H04L 9/3239 |
| 2019/0080407 | A1 * | 3/2019 | Molinari | G06Q 20/223 |
| 2019/0166116 | A1 * | 5/2019 | Kumar | H04L 9/0891 |
| 2019/0295336 | A1 * | 9/2019 | Jones | G07C 5/085 |
| 2019/0384594 | A1 * | 12/2019 | Michiyama | H04L 9/3247 |
| 2020/0073651 | A1 * | 3/2020 | Rodriguez Bravo | H04L 63/123 |
| 2020/0081699 | A1 * | 3/2020 | Majed | G06F 8/65 |

(Continued)

OTHER PUBLICATIONS

Dhakal, "Private Blockchain Network for IoT Device Firmware Integrity Verification and Update", Jan. 2019, In Proceedings of the 2019 IEEE 19th International Symposium on High Assurance Systems Engineering (HASE), Hangzhou, China, Jan. 3-5, 2019; pp. 164-170. (Year: 2019).*

(Continued)

*Primary Examiner* — Hossain M Morshed (57) ABSTRACT

A technology is described for managing and securing a software version history for a device using a blockchain. An example method can include receiving device information for a device configured to receive software updates, where a device history for the device can be contained in a blockchain distributed among multiple network nodes. The device information can be validated against the device history contained in the blockchain to confirm an identity of the device, and a software update can be initiated for the device. An indication that the software update was installed on the device can be received and a block can be generated to include information for the software update installed on the device. The block can be sent to the network nodes configured to determine acceptance of the block and append the block to the blockchain when the block is accepted.

19 Claims, 7 Drawing Sheets

(56) References Cited

U.S. PATENT DOCUMENTS

2020/0142681 A1* 5/2020 Marks ................. G06F 11/3495
2020/0142739 A1* 5/2020 Chan .......................... G06F 8/65

OTHER PUBLICATIONS

Lastoverska, "Blockchain Architecture Basics: Components, Structure, Benefits and Creation", Jan. 2019, https://mlsdev.com/blog/156-how-to-build-your-own-blockchain-architecture (Year: 2019).*
Rodriguez, "Querying the Blockchain: Why the graph might become one of the important protocol", 2019, https://hackernoon.com/querying-the-blockchain-why-the-graph-might-become-one-of-the-important-protocols-of-the-web3-eb77673bc967 (Year: 2019).*
Dhakal, "Private Blockchain Network for IoT Device Firmware Integrity Verification and Update", 2019, IEEE (Year: 2019).*
International Search Report for International Application No. PCT/US2020/028788 dated Aug. 7, 2020, 11 pages.

* cited by examiner

VERSION HISTORY MANAGEMENT USING A BLOCKCHAIN

BACKGROUND

Today's devices are often configured to execute software which is updatable via a software update. Software updates can be released to, for example, address security issues when they occur, address errors discovered in software, improve the operation of hardware and/or peripherals, and add support for new models of equipment. These updates can improve the operation of the software, improve the operation of hardware and add new features to the software and the device. For example, a firmware update can be sent to a device using a push protocol, and in response to receiving the firmware update, the device can be configured to install the updated firmware on the device.

Blockchain technology, or simply blockchain, is a data structure which can be used to store information, such as lists of transactions. The transactions can be bundled into blocks and each block (except for the first block or genesis block) refers back to or is linked to a prior block in the blockchain using hashing. Computer nodes maintain the blockchain and cryptographically validate each new block added to the blockchain using a validation process. The validation process can include solving a computationally difficult problem that can be independently verified and is sometimes called a "proof-of-work."

The data integrity of the blockchain (e.g., confidence that a previously recorded transaction has not been modified) can be maintained because each block in the blockchain refers to or includes a cryptographic hash value of the prior block. Accordingly, once a block refers to a prior block, it becomes difficult to modify or tamper with the data (e.g., the transactions) contained in the prior block because even a small modification to the data will affect the hash value of the entire block. Each additional block added to the blockchain increases the difficulty of tampering with the contents of an earlier block.

DETAILED DESCRIPTION

A technology is described for managing and securing software version history for a device using a blockchain. The blockchain can be used to track versions of software that have been installed on devices. The devices can include robotic devices, drone devices, IoT (Internet of Things) devices, home automation devices, manufacturing devices, embedded devices, as well as other types of computing devices configured to receive software updates. A software update can be a version of software that updates, upgrades, modifies, or replaces software installed on the device. In some instances, a software update can install new software on a device that did not previously exist on the device. A software update can include, but is not limited to firmware, an operating system, an application, security files, driver files, library files, services, etc. Software version information can be recorded in a blockchain and the blockchain can be distributed among computing nodes in a network. A network of computing nodes can be configured to maintain the blockchain and cryptographically validate each new block added to the blockchain using a validation process.

In one example of the technology, a software update service can be used to provide software updates to a device and add records to a blockchain that provide a history of software installed on the device. Recording an update history in the blockchain can provide an audit trail of software and software versions that have been installed on the device. By design, blockchains are inherently resistant to modification of data contained in the blockchain, such that once a transaction is added to the blockchain, the record of the transaction cannot be edited or deleted without being detected due to the distributed nature of the blockchain. The data integrity of the blockchain (i.e., the resistance to modification) can be used to protect an update history of a device from being modified and provide a high-level of assurance that the update history is valid.

An update history can include, but is not limited to, software version information, device information, user information, install date information, device status information, network information, as well as other information. In one example, a blockchain can be used to maintain an update history for an individual device. In another example, a blockchain can be used to maintain update histories for multiple devices. Moreover, in one example, authentication information for a software update can be maintained in a blockchain. The authentication information can be used by the software update service or a device to authenticate a software update (e.g., an install package, executable, file, etc.) prior to installing the software update on the device, as described in more detail later. The authentication information for the software update can be protected using the data integrity of the blockchain.

In the past, software update security has been centrally managed. For example, centrally located databases have been used to track the distribution of software updates to devices. Bad actors can exploit these databases in an attempt to infiltrate and take over a device. For example, a bad actor may illegally access a database and change or corrupt a software update history for a device in order to trigger an OTA (Over the Air) update that sends malicious software to the device. The present technology improves software update security by recording software update information for a device to a blockchain, thereby protecting a software update history using the data integrity of the blockchain which is distributed among a network of computing nodes. For example, a software update history can include information about past versions and a currently installed version of software on a device. The software update history can be used to validate a version of software installed on the device prior to sending a software update to the device (e.g., to prevent an authorized version of software on the device from corrupting the software update). Software authentication information, such as a software signature for a version of software can be maintained in a blockchain and the software authentication information can be used to validate a software update (e.g., by validating a source using the signature) prior to sending the software update to a device. After a device has been updated to a new version of the software, information associated with the software update can be recorded to the blockchain. Consequently, as described above, the present technology provides improvements to securing information associated with software updates for a device using the data integrity of a blockchain.

Figure 1:
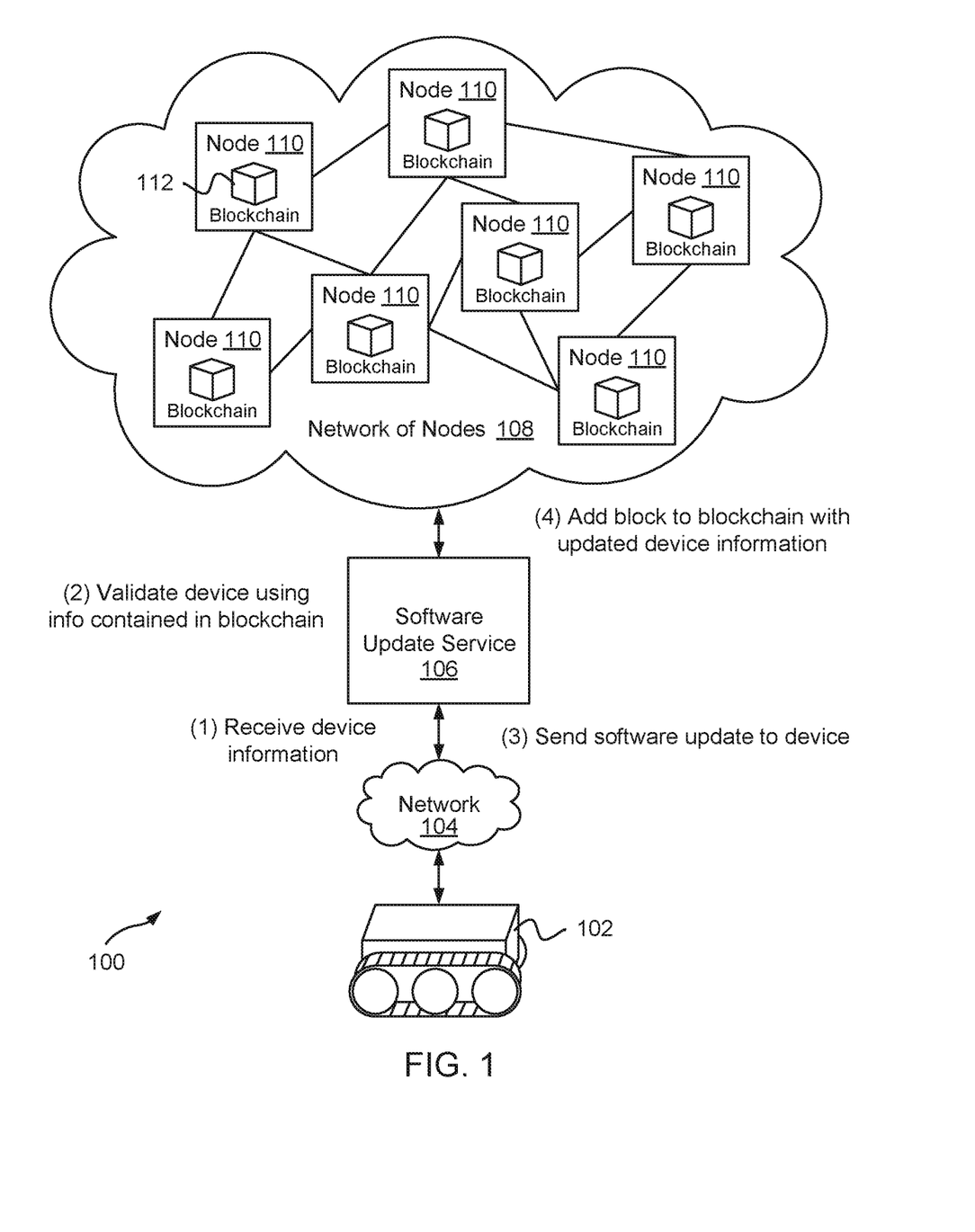
FIG. 1 is a diagram illustrating an example system and method for managing a software version history using a blockchain.

To further describe the present technology, examples are now provided with reference to the figures. FIG. 1 is a diagram illustrating a high level example of a system 100 and method for managing software version history using a blockchain 112. The system 100 can include a software update service 106 which is in network communication with a device 102 (e.g., a robotic device) and a network of computing nodes 108 configured to maintain the blockchain 112. The device 102 can include any device configured to execute software that is updateable via a software update. Non-limiting examples of a device 102 include a robotic device, drone device, IoT device, home automation device, manufacturing device, mobile device (e.g., smartphone, tablet, e-reader, laptop computer, etc.), desktop computer, server, and the like. The blockchain 112 can contain, but is not limited to, device information for a device 102, a software update history for the device 102, and/or software authentication information for a software update that may be available for installation on the device 102. The computing nodes 110 (or peers) in the network of computing nodes 108 host the blockchain 112 and the computing nodes 110 are in network communication with one another (e.g., using the internet, a LAN (local area network), a WAN (wide area network), etc.). The computing nodes 110 can expose a set of APIs (Application Programming Interfaces) that enable the network of computing nodes 112 and the software update service 106 to interact with one another in order to access and modify the blockchain 112.

The software update service 106 can be configured to distribute software updates to devices 102. As described in greater detail later, in one example, the software update service 106 can validate device information for a device 102, which is recorded in the blockchain 112 (e.g., determine if is this a valid device or licensed device), and send a software update to the device 102, which is configured to install the software update on the device 102. For example, the software update service 106 can receive device information for a device 102 (e.g., via a device information query or directly from a device 102). The device information can include a device identifier and a current version of software installed on the device, as well as other information. The software service 106 can validate the device information to confirm the identity of the device 106 and a version of software installed on the device 106. In one example, the device information (e.g., device identifier and software version) can be validated against a device record contained in the blockchain 112.

After successful validation of the device information, the software update service 106 can identify a software update for the device 102 and send the software update to the device 102. For example, the software update service 106 can use information for a current version of software (e.g., version 1.0) installed on a device 102 to identify a software update (e.g., version 2.0) and send the software update to the device 102. In one example, prior to sending a software update to a device 102, the software update can be authenticated using software authentication information (e.g., a software signature or a certificate) contained in the blockchain 112. As described later, the software authentication information can be stored to a blockchain 112 to secure the software authentication information using the data integrity of the blockchain 112.

In response to receiving a software update, a device 102 installs the software update on the device 102. After the software update is installed on the device 102, the software update service 106 can initiate generation of a block to include software update information, such as a device identifier for the device 102, software version installed on the device 102, install date, etc. In one example, the software update service 106 can send the software update information to the nodes 110, and the nodes 110 can generate and validate the block, and append the block to the blockchain 112. In another example, the software update service 106 can generate a block to include the software update information and send the block to the nodes 110, and the nodes 110 can determine acceptance of the block and append the block to the blockchain 112. In appending the block to the blockchain 112, the block can store a software update history for the device 102, and the update history is protected by way of the data integrity of the blockchain 112 and the distributed nature of the blockchain 112.

In one example, generating a new block to add to the blockchain 112 can include identifying the latest block added to the blockchain 112 (i.e., the last block appended to the blockchain 112) and obtaining a block identifier from the last block. The block identifier from the last block can be included in the new block along with the software update information, and a block identifier for the new block can be generated by applying a hash function to the information included in the new block. For example, the block identifier for the new block can be generated by applying a hash function to the block identifier from the last block and the software update information received from software update service 106.

The nodes 110 can determine acceptance of the block by validating the information contained in the block. For example, a node 110 can validate the block identifier included in a block received from the software update service 106 by reproducing the block identifier with the hashing method used to originally generate the block identifier and comparing the reproduced block identifier to the block identifier in the block received from the software update service 106. As an example, the node 110 can reproduce the block identifier by applying a hash function to the software update information contained in the block received from the software update service 106 and a block identifier obtained from a previous block in the blockchain 122 stored on the node 110. If the reproduced block identifier corresponds to the block identifier in the block received from the software update service 106, the block is considered validated and the node 110 can append the block to the copy of the blockchain 112 stored on the node 110. If the reproduced block identifier does not correspond to the block identifier in the block received from the software update service 106, the block may not be appended to the blockchain 112.

In one example, nodes 110 can perform proof-of-work processing to determine which node 110 adds a block to the blockchain 112. As an illustration, the software update service 106 can publish software update transactions to the nodes 110, and due to latency, the nodes 110 can receive the software update transactions at different times. As a result, blocks generated by the nodes 110 can include different software update transactions, and therefore, a determination can be made which node 110 adds a block to the blockchain 112. Nodes 110 can perform proof-of-work processing to determine which node 110 adds the block to the blockchain 112. Illustratively, proof-of-work processing can include solving a computing calculation (e.g., a cryptographic puzzle) that can be verified. The first node 110 to complete the proof-of-work processing is selected to add the block to the blockchain 112. In some cases, a node 110 selected to add a block to the blockchain 112 can receive an award, which can be a monitory award, or another type of incentive to compete against other nodes 110. In another example, proof-of stake can be used to determine which node 110 adds a block to the blockchain 112. Proof-of stake selects a node 110 to generate a block using a deterministic method, and the node 110 puts up a stake (e.g., a monetary value) which the node 110 can lose if the node 110 does not generate a valid block. As will be appreciated, the technology is not limited to the techniques for generating and adding a block to the blockchain 112 described above. Any technique for generating and adding a block to a blockchain is contemplated and within the scope of this disclosure.

Figure 2A:
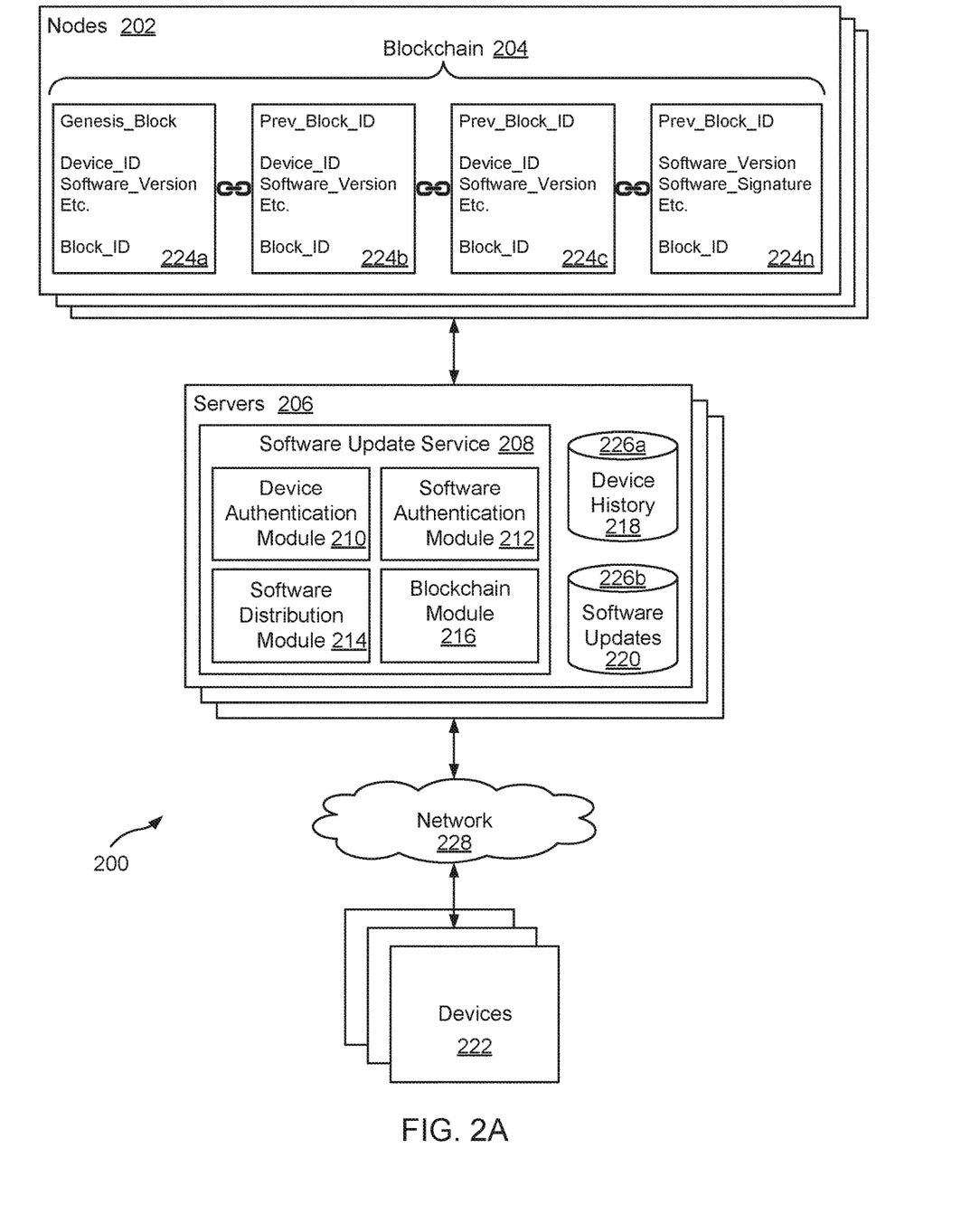
FIGS. 2A and 2B are block diagrams that illustrate example components included in a system for updating device software and managing software version history using a blockchain.

FIG. 2A illustrates components of an example system environment 200 on which the present technology can be executed. The system environment 200 can include a plurality of servers 206 configured to host a software update service 208 and data stores 226a-b containing device histories 218 for devices 222 and software updates 220 (e.g., versions of software executables). The system 200 can include a plurality of nodes 202 used to maintain one or more blockchains 204. A node 202 can include a server or another computing device configured to execute blockchain software used to perform blockchain functions, such as validating information stored in a blockchain 204, performing proof-of-work processing to determine whether a node 202 generates a block 224a-n, generating a block 224a-n to include information related to a device 222 and/or a software update, and adding a block 224a-n to a blockchain 204.

A blockchain 204 can include a plurality of linked blocks 224a-n containing a device history of software installed on a device 222. A blockchain 204 can contain a device history for a single device 222 or device histories for multiple devices 222. For example, a blockchain 204 can contain device histories for devices 222 included in a device network, such as a network of IoT devices, a network of robotic devices, a network of drone devices, and the like. A device history for a device 222 can contain a device identifier (e.g., a unique device identifier (UDI), a universal unique identifier (UUID), a media access control address (MAC address), international mobile equipment identity (IMEI), a proprietary unique hardware identifier, etc.), historical device information (e.g., last known location, network address, device state, etc.), software version information (e.g., software version number, security patch level and date, software build number, etc.), and a time reference indicating when the device history for the device 222 was added to the blockchain 204. In one example, as shown in the block 224n, a blockchain 204 can contain software authentication information used to validate a software update 220 as described below.

In one example, a device history contained in a blockchain 204 can be stored in a device history data store 226a that is accessible to the software update service 208. For example, a copy of the blockchain 204 can be obtained from a node 202 and the device history can be extracted from the blockchain 204 and stored in the device history data store 226a. The device history 218 contained in the device history data store 226a can be regularly updated from the blockchain 204 in order to maintain the data integrity of the device history 218 contained in the device history data store 226a. In another example, a device history can be obtained directly from a blockchain 204 by retrieving the blockchain 204, or a portion of the blockchain 204, from a node 202.

The software update service 208 can provide software updates 220 to devices 222 registered with the software update service 208. In one example, the software update service 208 can comprise a number of modules, including, but not limited to, a device authentication module 210, a software authentication module 212, a software distribution module 214, and a blockchain module 216. The device authentication module 210 can be configured to authenticate a device 222 to confirm the identity of the device 222. A device 222 can be authenticated by comparing device information received from the device 222 to device information contained in a blockchain 204. Illustratively, device information for a device 222 can include a device identifier and/or device characteristics (e.g., device type, device account, IP address, current version of software installed on the device 222, etc.), which can be validated against device information obtained from a device history 218 contained in the blockchain 204. As a non-limiting example, a MAC address, device account number, and a device model number received from a device 222 can be validated against a MAC address, device account number, and a device model number contained in a device history 218. The device history 218 can be obtained from the device history data store 226a and/or from the blockchain 204.

The software distribution module 214 can be configured to determine whether a device 222 is eligible to receive a software update 220 and initiate sending of the software update 220 to the device 222. Illustratively, a software update 220 can be sent to a device 222 in response to receiving a software update request from the device 222 (e.g., a device 222 can periodically communicate with and "check-in" with the software update service 208 to determine whether a software update 220 is available), and/or in response to a determination that the device 222 is eligible for the software update 220 (e.g., device histories 218 can be queried to identify devices 222 that are eligible to receive a software update 220).

In response to receiving a software update request from a device 222, the software distribution module 214 can be used to determine whether a software update 220 is available for the device 222. As an illustration, using a device identifier for the device 222, the software distribution module 214 can reference a device history 218 (e.g., located in the device history data store 226a and/or obtained directly from the blockchain 204) associated with the device 222 to identify a version of software that is currently installed on the device 222, and the software distribution module 214 can query a software update data store 226b to determine whether a new version of the software is available to be installed on the device 222. If a software update 220 is available, the software distribution module 214 can initiate sending of the software update 220 to the device 222 for installation on the device 222.

As mentioned above, the software distribution module 214 can be used to identify devices 222 that can be eligible to receive a software update 220. For example, a software update 220 can be released and the software distribution module can be used to identify devices 222 that are eligible to receive the newly released software update 220. The software distribution module 214 can determine whether a device 222 is eligible to receive a software update 220 by referencing a device history 218 associated with the device 222 and determine whether a software update 220 is available for the device 222 based on factors, such as, a software version currently installed on a device 222, a device type, a device location (e.g., network location, geographic location, etc.), current device use, as well as other factors.

In one example, the software distribution module 214 can be configured to verify that a software version currently installed on a device 222 corresponds to a software version recorded in a device history 218. For example, device information received from a device 222 can include information for a version of software installed on the device 222 and the software distribution module 214 can compare the software version information received from the device 222 with the software version recorded in a device history 218 as currently installed on the device 222. A disagreement between software versions can indicate that the device 222 has been compromised and appropriate action can be taken to recover the device 222. In the case that the software version currently installed on the device 222 corresponds to the software version recorded in a device history 218, then the software distribution module 214 can initiate sending of the software update 220 to the device 222.

The software distribution module 214 can initiate sending a software update 220 to a device 222 by obtaining the software update 220 (e.g., a copy of software) from a software update data store 226b and sending the software update 220 over a network 228 to the device 222, or instructing the software update data store 226b to send the software update 220 to the device 222. The software update 220 can be sent to the device 222 with instructions to install the software update 220 on the device 222. Alternatively, the software distribution module 214 can send a network location of the software update 220 (e.g., a Uniform Resource Identifier (URI)) to the device 222 with instructions to obtain the software update 220 from the network location and install the software update 220 on the device 222. After installing the software update 220 on the device 222, the device 222 can send a message to the software update service 106 indicating that the software update 220 was successfully installed on the device 222.

The software authentication module 212 can be configured to validate a software update 220 using a software signature contained in the blockchain 204. For example, the software authentication module 212 can be used to generate a software signature for a software update 220 (e.g., by encrypting the software update 220 with a private key or applying a hash function to the software update 220) and the software signature can be stored to the blockchain 204 (as shown in block 224n). Storing the software signature in the blockchain 204 can protect the software signature from being altered using the data integrity and distributed nature of the blockchain 204. As such, any attempt to modify or replace the software signature can be detected by referencing the blockchain 204 to determine whether changes have been made to the blockchain 204.

In one example, the software authentication module 212 can obtain a software signature for a software update 220 (e.g., from the blockchain 204) and validate the software update 220 by applying a hash function to the software update 220 and comparing the results of the hash function to the software signature associated with the software update 220. After successful validation of the software update 220, the software update 220 can be sent to one or more devices 222. In another example, the software authentication module 212 can provide a software signature to a device 222 and the device 222 can validate a software update 220 using the software signature.

The blockchain module 216 can be configured to perform functionality associated with the blockchain 204. In one example, the blockchain module 216 can be used to add blocks 224a-n to the blockchain 204 by generating a block 224a-n and sending the block 224a-n to the nodes 202 which append the block 224a-n to the blockchain 204. In another example, the blockchain module 216 can be used to send information (e.g., software update information and/or software signatures) to the nodes 202 in a network of nodes 202 enabling one or more nodes 202 to generate a block 224a-n to include the information and add the block 224a-n to the blockchain 204. In yet another example, the blockchain module 216 can be used to obtain the blockchain 204 or a portion of the blockchain 204 and provide device history information stored in the blockchain 204 to any of the modules 210/212/214. Also, in one example, the blockchain module 216 can be used to obtain device history information from the blockchain 204 (e.g., periodically or on demand) and store the device history information in a device history data store 226a that is accessible to the modules 210/212/214.

The system environment 200 can include computing resources for executing virtual machines, which can be an instance of a software implementation of a machine (i.e. a computer) configured to emulate a physical machine. In one example, the server 206 can comprise a virtual machine used to host the software update service 208.

Figure 2B:
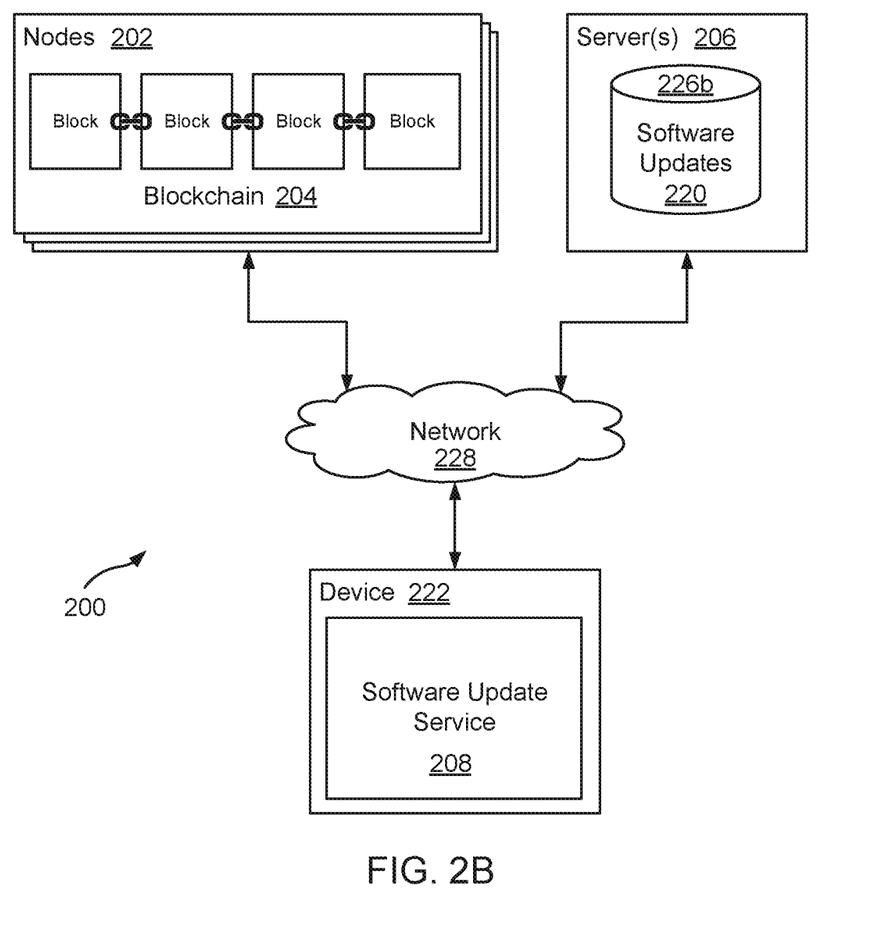

In an alternative example, as illustrated in FIG. 2B, one or more modules of the software update service 208 can be hosted on a device 222 and the modules can be used to update software installed on the device 222 as described above. For example, the software update service 208 can be executed on the device 222 and the software update service 208 can validate device information stored on the device 222 with a device history contained in a blockchain 204 and initiate a software update on the device 222 by retrieving the software update 220 from an update data store 226b. After the software update has been installed on the device 222, the software update service 208 can initiate generation of a block to include information for the software update installed on the device and append the block to the blockchain 204 using one of the methods described above.

The various processes and/or other functionality contained within the system environment 200 can be executed on one or more processors that are in communication with one or more memory modules. The system environment 200 can include a number of computing devices that are arranged, for example, in one or more server banks or computer banks or other arrangements. The computing devices can support a computing environment using hypervisors, virtual machine monitors (VMMs), and other virtualization software. The term "data store" can refer to any device or combination of devices capable of storing, accessing, organizing and/or retrieving data, which can include any combination and number of data servers, relational databases, object oriented databases, cluster storage systems, data storage devices, data warehouses, flat files and data storage configuration in any centralized, distributed, or clustered environment. The storage system components of the data store can include storage systems such as a SAN (Storage Area Network), cloud storage network, volatile or non-volatile RAM, optical media, or hard-drive type media. The data store can be representative of a plurality of data stores as can be appreciated.

API calls, procedure calls or other network commands that may be made in relation to the modules and services included in the system environment 200 can be implemented according to different technologies, including, but not limited to, Representational state transfer (REST) technology or Simple Object Access Protocol (SOAP) technology. REST is an architectural style for distributed hypermedia systems. A RESTful API (which can also be referred to as a RESTful web service) is a web service API implemented using HTTP and REST technology. SOAP is a protocol for exchanging information in the context of Web-based services.

The network 228 can include any useful computing network, including an intranet, the Internet, a local area network, a wide area network, a wireless data network, or any other such network or combination thereof. Components utilized for such a system can depend at least in part upon the type of network and/or environment selected. Communication over the network 228 can be enabled by wired or wireless connections and combinations thereof.

FIGS. 2A and 2B illustrate that certain processing modules can be discussed in connection with this technology and these processing modules can be implemented as computing services. In one example configuration, a module can be considered a service with one or more processes executing on a server or other computer hardware. Such services can be centrally hosted functionality or a service application that can receive requests and provide output to other services or consumer devices. For example, modules providing services can be considered on-demand computing that are hosted in a server, virtualized service environment, grid or cluster computing system. An API can be provided for each module to enable a second module to send requests to and receive output from the first module. Such APIs can also allow third parties to interface with the module and make requests and receive output from the modules. While FIGS. 2A and 2B illustrate examples of a system that can implement the techniques above, many other similar or different environments are possible. The example environments discussed and illustrated above are merely representative and not limiting.

Figure 3:
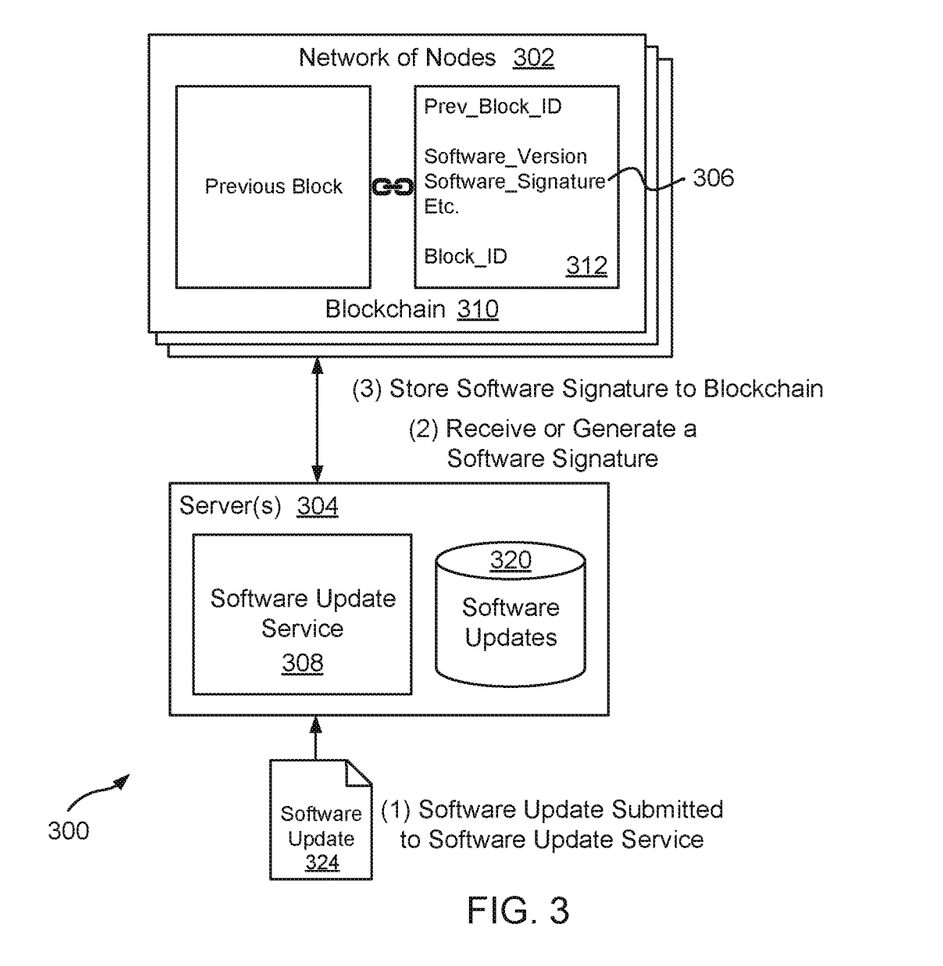
FIG. 3 is a block diagram illustrating an example system and method for submitting a software update to a software update service and storing software authentication information for the software update to a blockchain.

FIG. 3 is a block diagram illustrating an example system 300 and method for submitting a software update 324 to a software update service 308 and storing software authentication information for the software update 324 to a blockchain 310. The software authentication information can include a software signature 306 used to verify the identity of the software author and/or software build system, and a checksum to verify that the computer code of the software update 324 has not been altered or corrupted. The authentication information can also include versioning information for the software update 324 and other metadata about the software update 324. For the benefit of simplicity, the description below will focus on the software signature 306 with the understanding that other or additional software authentication information can be used.

As illustrated, a software update 324 can be submitted to a server 304 that hosts the software update service 308. The software update 324 can be a version of software that updates, upgrades, or replaces software installed on a device. An administrator can upload the software update 324 (e.g., an executable file) to the server 304 and software update 324 can be stored to a data store 320 accessible to the software update service 308.

In one example, a software signature 306 can be included with the software update 324. For example, the software update 324 can be signed (e.g., encrypted) using a software signing technique involving a public/private key pair. As an illustration, a software developer can use a private key to sign the software update 324 after building the software update 324. The signing can be performed using the developer's private key or a private key obtained from a trusted certificate authority (CA), and the software update 324 can be uploaded with the software signature 306 (e.g., a public key infrastructure (PKI) certificate) to the server 304. After the software update 324 and software signature 306 has been uploaded to the server 304, a block 312 can be created to include the software signature 306 (e.g., the PKI certificate) and information for the software update 324 (e.g., a software update identifier, such as a version number). The block 312 can then be appended to the blockchain 310. In one example, the software update service 308 can generate the block 312 to include the software signature 306 and send the block 312 to a network of nodes 302 configured to determine acceptance of the block 312 and append the block 312 to the blockchain 310 when the block 312 is accepted. In another example, the software update service 308 can send the software signature 306 and the information for the software update 324 to the network of nodes 302, and the nodes 302 can generate the block 312 and append the block 312 to the blockchain 310.

In another example, the software update service 308 can be configured to generate a software signature 306 for the software update 324 using a cryptographic hash function (e.g., MD5, SHA-1, SHA-256, and the like). For example, after uploading the software update 324 to the server 304, the software update service 308 can apply the cryptographic hash function to the software update 324 to generate a software signature 306. The software update service 308 can then, in one example, send the software signature 306 and information for the software update 324 to the network of nodes 302 to be stored in a block 312 in the blockchain 310. In another example, the software update service 308 can generate a block 312 containing the software signature 306 and the information for the software update 324, and the software update service 308 can send the block 312 to the network of nodes 302 to be appended to the blockchain 310. In one example, the blockchain 310 can be dedicated to storing software signatures for software updates. In another example, the blockchain 310 can be used to store both software signatures for software updates, the update histories for devices described earlier, as well as any other information related to the software updates (e.g., a network storage location of a software update).

Figure 4:
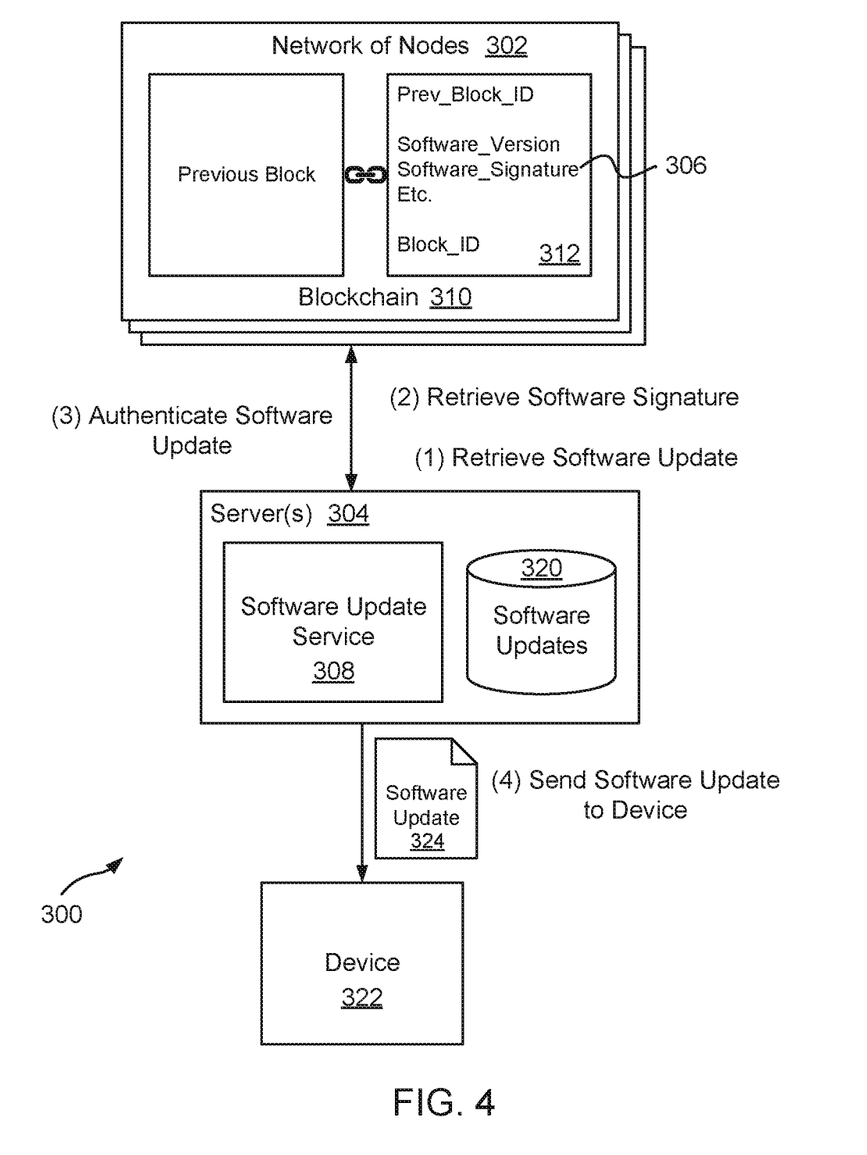
FIG. 4 is a block diagram illustrating an example system and method for validating a software update using authentication information contained in a blockchain.

FIG. 4 is a block diagram illustrating the system 300 and a method for validating the software update 324 using the software signature 306 stored to the blockchain 310. As part of updating software on a device 322, the software update 324 can be validated using the software signature 306 stored in the blockchain 310 to ensure that the software update 324 has not been altered or corrupted.

In one example, as part of updating software on the device 322, the software update 324 (e.g., an executable file) can be identified for the device 322 and the software update 324 can be retrieved from a software update data store 320. In one example, the software signature 306 associated with the software update 324 can be retrieved from the block 312 in the blockchain 310, and the software signature 306 can be validated using a public key to authenticate the software signature. In one example, the public key can be traceable back to a trusted root certificate authority (CA) using a secure public key infrastructure (PKI). In one example, validation of the software signature 306 can be performed by the software update service 308 prior to sending the software update 324 to a device 322. In another example, validation of the software signature 306 can be performed by the device 322 as part of updating software on the device 322 with the software update 324.

In another example, the software signature 306 can be retrieved from the blockchain 310 and the software signature 306 can be compared to a software signature stored with the software update 324 in the software update data store 320. For example, a software signature 306 can be generated by applying a cryptographic hash function to a software update file, and the resulting software signature 306 can be stored in the blockchain 310, and a copy of the software signature 306 can be stored in the software update data store 320 with the software update 324. At the time a device 322 receives the software update 324, the software signature 306 for the software update 324 can be validated by retrieving the software signature 306 from the blockchain 310 and the copy of the software signature 306 from the software update data store 320, and the software signatures can be compared to ensure that the software signatures match. In one example, the software update service 308 can be used to compare the software signatures. In another example, the software signature 306 and the copy of the software signature 306 can be sent with the software update 324 to a device 322, and the device 322 can validate the software signature 306 by performing a comparison of the software signature 306 and the copy of the software signature 306.

Figure 5:
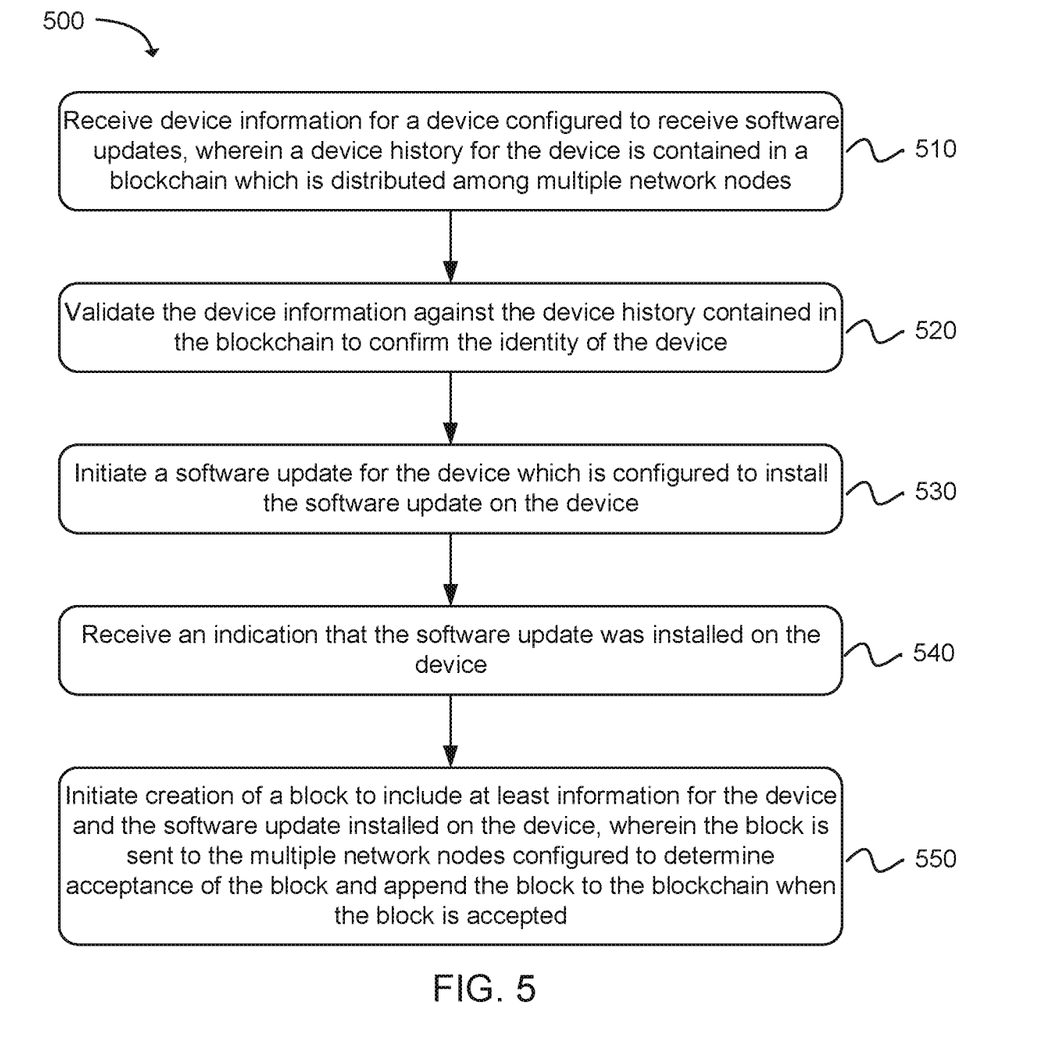
FIG. 5 is a flow diagram that illustrates an example method for updating software on a device and storing an update history for the device in a blockchain.

FIG. 5 is a flow diagram that illustrates an example method 500 for updating software on a device and storing an update history for the device in a blockchain. As in block 510, device information for a device configured to receive software updates can be received, and a device history for the device can be contained in a blockchain which is distributed among multiple network nodes. For example, the device information can be received at a software update service hosted in a service provider environment, or at a software update service hosted on the device itself.

As in block 520, the device information can be validated against the device history contained in the blockchain to confirm an identity of the device. In one example, validating the device information against the device history can include obtaining the device history from the blockchain, validating a device identifier included in the device information against a device identifier recorded in the device history to confirm the identity of the device or to confirm the device has a software license, and checking a software version identifier included in the device information against a software version recorded in the device history to confirm the version of software currently installed on the device. In one example, the device history can be obtained from a peer node which stores a copy of the blockchain. In another example, a portion of the blockchain can be obtained from a peer node and the device history for the device can be obtained from the portion of the blockchain.

As in block 530, a software update can be initiated for the device configured to install the software update on the device. In one example, initiating the software update can include sending a software copy associated with the software update to the device with instructions to install the software copy on the device. In another example, initiating the software update can include sending a network location of a software copy to the device with instructions to obtain the software copy from the network location and install the software copy on the device. In yet another example, the device can initiate the software update by sending a request for a software copy of the software update from a software update service, or retrieving a software copy of the software update from a remote storage location or a local storage location on the device itself.

In one example, as part of identifying that the software update is available to be installed on the device, the updated version of the software for the device can be identified and the updated version of the software can be authenticated using software authentication information contained in the blockchain. For example, software authentication information (e.g., a software signature for the software update) can be obtained from the blockchain and, in one example, the software authentication information can be used by the software update service to validate the software update, or in another example, the software authentication information can be provided to the device, which can be configured to validate the software update using the software authentication information.

As in block 540, an indication can be received that the software update was installed on the device. As an example, the device can send a message to the software update service indicating that the software update was successfully installed on the device. As another example, the software update service can periodically query the device to determine whether the software update has been installed.

As in block 550, generation of a block can be initiated to include information for the device and the software update installed on the device, as well as other information. In one example, initiating generation of the block can include sending updated device information to the multiple network nodes indicating that the software update has been installed on the device, and in response to receiving the updated device information, the multiple network nodes can perform proof-of-work processing to determine which network node generates the block to include the information for the device and the software update installed on the device. In another example, initiating generation of the block can include obtaining a previous block identifier for a latest added block in the blockchain from the blockchain, where a block identifier can be generated by applying a hash function to information contained in a block and storing the previous block identifier in the block. The multiple network nodes can be included in one of a public network of peer nodes or a private network of peer nodes. The block can be sent to the multiple network nodes, which are configured to determine acceptance of the block and append the block to the blockchain when the block is accepted. In one example, the block can be encrypted prior to sending the block to the network of peer nodes to protect the information contained in the block from exploitation if intercepted. Acceptance of the block by the network of peer nodes can be based on a determination that a majority of peer nodes that have received the block have communicated agreement to accept the block.

Figure 6:
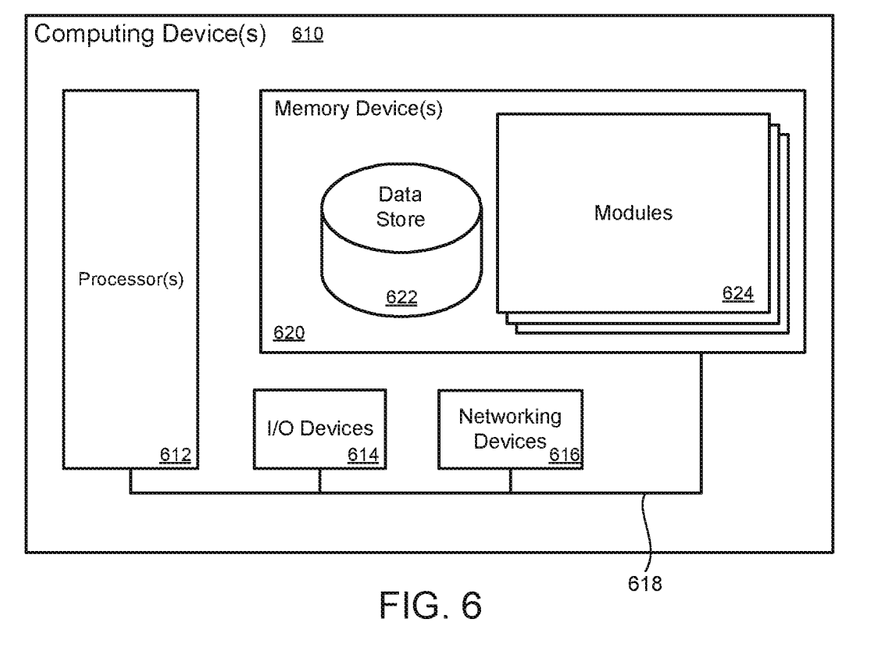
FIG. 6 is block diagram illustrating an example of a computing device that can be used to execute a method for managing a version history using a blockchain.

FIG. 6 illustrates a computing device 610 on which modules of this technology can execute. A computing device 610 is illustrated on which a high level example of the technology can be executed. The computing device 610 can include one or more processors 612 that are in communication with memory devices 620. The computing device 610 can include a local communication interface 618 for the components in the computing device. For example, the local communication interface 618 can be a local data bus and/or any related address or control busses as can be desired.

The memory device 620 can contain modules 624 that are executable by the processor(s) 612 and data for the modules 624. The modules 624 can execute the functions described earlier. A data store 622 can also be located in the memory device 620 for storing data related to the modules 624 and other applications along with an operating system that is executable by the processor(s) 612.

Other applications can also be stored in the memory device 620 and can be executable by the processor(s) 612. Components or modules discussed in this description that can be implemented in the form of software using high-level programming languages that are compiled, interpreted or executed using a hybrid of the methods.

The computing device can also have access to I/O (input/output) devices 614 that are usable by the computing devices. Networking devices 616 and similar communication devices can be included in the computing device. The networking devices 616 can be wired or wireless networking devices that connect to the internet, a LAN, WAN, or other computing network.

The components or modules that are shown as being stored in the memory device 620 can be executed by the processor(s) 612. The term "executable" can mean a program file that is in a form that can be executed by a processor 612. For example, a program in a higher level language can be compiled into machine code in a format that can be loaded into a random access portion of the memory device 620 and executed by the processor 612, or source code can be loaded by another executable program and interpreted to generate instructions in a random access portion of the memory to be executed by a processor. The executable program can be stored in any portion or component of the memory device 620. For example, the memory device 620 can be random access memory (RAM), read only memory (ROM), flash memory, a solid state drive, memory card, a hard drive, optical disk, floppy disk, magnetic tape, or any other memory components.

The processor 612 can represent multiple processors and the memory device 620 can represent multiple memory units that operate in parallel to the processing circuits. This can provide parallel processing channels for the processes and data in the system. The local communication interface 618 can be used as a network to facilitate communication between any of the multiple processors and multiple memories. The local communication interface 618 can use additional systems designed for coordinating communication such as load balancing, bulk data transfer and similar systems.

While the flowcharts presented for this technology can imply a specific order of execution, the order of execution can differ from what is illustrated. For example, the order of two more blocks can be rearranged relative to the order shown. Further, two or more blocks shown in succession can be executed in parallel or with partial parallelization. In some configurations, one or more blocks shown in the flow chart can be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more blocks of computer instructions, which can be organized as an object, procedure, or function. Nevertheless, the executables of an identified module need not be physically located together, but can comprise disparate instructions stored in different locations which comprise the module and achieve the stated purpose for the module when joined logically together.

Indeed, a module of executable code can be a single instruction, or many instructions and can even be distributed over several different code segments, among different programs and across several memory devices. Similarly, operational data can be identified and illustrated herein within modules and can be embodied in any suitable form and organized within any suitable type of data structure. The operational data can be collected as a single data set, or it can be distributed over different locations including over different storage devices. The modules can be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein can also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics can be combined in any suitable manner in one or more examples. In the preceding description, numerous specific details were provided, such as examples of various configurations to provide a thorough understanding of examples of the described technology. It will be recognized, however, that the technology can be practiced without one or more of the specific details, or with other methods, components, devices, etc. In other instances, well-known structures or operations are not shown or described in detail to avoid obscuring aspects of the technology.

Although the disclosure may not expressly disclose that some examples or features described herein can be combined with other examples or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A computer implemented method, comprising:
   obtaining, in response to a release of a software update, device histories for a plurality of devices from a blockchain;
   referencing the device histories obtained from the blockchain to identify which of the plurality of devices are eligible to receive the software update, wherein the blockchain is distributed among multiple network nodes, and the plurality of devices are configured to receive software updates;
   obtaining device information for a device of the plurality of devices identified as being eligible to receive the software update;
   validating the device information against a device history for the device obtained from the blockchain to confirm an identity of the device;
   initiating a software update for the device which is configured to install the software update on the device;
   receiving an indication that the software update was installed on the device; and
   initiating generation of a block to include device information and information for the software update installed on the device, wherein the block is sent to the multiple network nodes to determine acceptance of the block and append the block to the blockchain when the block is accepted.

2. The method as in claim 1, further comprising:
   obtaining the device history for the device from the blockchain;
   validating a device identifier included in the device information against a device identifier recorded in the device history to confirm the identity of the device; and
   checking a software version identifier included in the device information against a software version recorded in the device history to confirm a version of software currently installed on the device.

3. The method as in claim 1, further comprising:
   obtaining a software signature for the software update from the blockchain; and
   providing the software signature to the device which is configured to validate a copy of the software update using the software signature.

4. The method as in claim 1, wherein initiating the software update further comprises sending a software copy associated with the software update to the device with instructions to install the software copy on the device.

5. The method as in claim 1, wherein initiating the software update further comprises sending a network location of a software copy to the device with instructions to obtain the software copy from the network location and install the software copy on the device.

6. The method as in claim 1, wherein initiating generation of the block further comprises:
   sending updated device information to the multiple network nodes indicating that the software update has been installed on the device; and
   performing, by the multiple network nodes in response to receiving the updated device information, proof-of-work processing to determine which network node generates the block to include the device information and the information for the software update installed on the device.

7. The method as in claim 1, wherein initiating generation of the block further comprises:
   obtaining a previous block identifier for a latest added block in the blockchain from the blockchain, wherein a block identifier is generated by applying a hash function to information contained in a block; and
   storing the previous block identifier in the block.

8. The method as in claim 7, further comprising:
   generating a current block identifier for the block by applying the hash function to information contained in the block; and
   storing the current block identifier in the block.

9. The method as in claim 1, wherein the multiple network nodes are included in one of a public network of peer nodes or a private network of peer nodes.

10. The method as in claim 1, wherein the device is a robotic device configured to receive software updates.

11. The method as in claim 1, wherein identifying which of the plurality of devices associated with the device histories are eligible to receive the software update further comprises comparing the device histories to a plurality of factors that determine eligibility of a device to receive the software update.

12. A system, comprising:
    at least one processor;
    a memory device including instructions that, when executed by the at least one processor, cause the system to:
    obtain, in response to a release of a software update, device histories for a plurality of devices from a blockchain;
    reference the device histories obtained from the blockchain to determine which of the plurality of devices are eligible to receive the software update, wherein the blockchain is distributed among a network of peer nodes, and the plurality of devices are configured to receive software updates;
    obtain device information for a device of the plurality of devices determined to be eligible to receive the software update, wherein the device information includes a device identifier and a version of software currently installed on the device;
    validate the device information using a device history for the device to confirm the identity of the device and the version of software currently installed on the device;
    send an updated version of the software to the device, which is configured to install the updated version of the software on the device;

receive an indication that the updated version of the software has been installed on the device;

generate a block to include device information and information for the software update version installed on the device; and send the block to the network of peer nodes which determine acceptance of the block and append the block to the blockchain when the block is accepted.

13. The system as in claim 12, wherein the memory device further includes instructions that, when executed by the at least one processor, cause the system to:

identify the updated version of the software for the device; and authenticate the updated version of the software using software authentication information contained in the blockchain.

14. The system as in claim 12, wherein the memory device further includes instructions that, when executed by the at least one processor, cause the system to obtain the device histories from a peer node which stores a copy of the blockchain.

15. The system as in claim 12, wherein the memory device further includes instructions that, when executed by the at least one processor, cause the system to:

obtain a portion of the blockchain from a peer node; and obtain the device histories from the portion of the blockchain.

16. The system as in claim 12, wherein acceptance of the block by the network of peer nodes is based in part on a determination that a majority of peer nodes that have received the block have communicated agreement to accept the block.

17. A non-transitory machine readable storage medium including instructions embodied thereon, the instructions when executed by one or more processors:

obtain, in response to a release of a software update, device histories for a plurality of devices from a blockchain;

reference the device histories obtained from the blockchain to determine which of the plurality of devices are eligible to receive the software update, wherein the plurality of devices are configured to receive software updates, and the device histories for the plurality of devices are contained in the blockchain which is distributed to a network of peer nodes;

obtain device information for a device of the plurality of devices determined to be eligible to receive the software update;

validate the device information against a device history obtained from the blockchain to confirm an identity of the device and a version of software currently installed on the device;

identify a software update associated with the device;

authenticate the software update using software authentication information obtained from the blockchain to confirm that the software update has not been modified;

send the software update to the device which is configured to install the software update;

receive an indication that the software update was installed on the device;

generate a block to include device information and information for the software update installed on the device; and send the block to the network of peer nodes to determine acceptance of the block and append the block to the blockchain when the block is accepted.

18. The non-transitory machine readable storage medium in claim 17, further comprising instructions, that when executed by the one or more processors, authenticate the identity of the device by comparing a device identifier included in the device information to a device identifier included in the device history obtained from the blockchain.

19. The non-transitory machine readable storage medium in claim 17, further comprising instructions, that when executed by the one or more processors, encrypt the block prior to sending the block to the network of peer nodes.

* * * * *